(12) United States Patent
Hosotani

(10) Patent No.: US 9,948,141 B2
(45) Date of Patent: Apr. 17, 2018

(54) WIRELESS POWER TRANSFER APPARATUS

(71) Applicant: MURATA MANUFACTURING CO., LTD., Kyoto-fu (JP)

(72) Inventor: Tatsuya Hosotani, Kyoto-fu (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 264 days.

(21) Appl. No.: 14/681,993

(22) Filed: Apr. 8, 2015

(65) Prior Publication Data

US 2015/0214788 A1 Jul. 30, 2015

Related U.S. Application Data

(63) Continuation of application No. PCT/JP2013/077431, filed on Oct. 9, 2013.

(30) Foreign Application Priority Data

Oct. 11, 2012 (JP) .................... 2012-225917

(51) Int. Cl.
  *H01F 27/42* (2006.01)
  *H02J 17/00* (2006.01)
  (Continued)

(52) U.S. Cl.
  CPC .............. *H02J 17/00* (2013.01); *H02J 5/005* (2013.01); *H02J 7/025* (2013.01); *H02J 50/12* (2016.02); *H02J 50/50* (2016.02); *H02M 3/337* (2013.01)

(58) Field of Classification Search
  CPC . H01F 38/14; H02J 5/005; H02J 17/00; H02J 7/025; H02M 3/3376; H02M 2001/0058; Y02B 70/1433; Y02B 70/1491
  (Continued)

(56) References Cited

U.S. PATENT DOCUMENTS 7,782,633 B2   8/2010 Yamauchi et al.
2004/0232845 A1  11/2004 Baarman et al.
(Continued)

FOREIGN PATENT DOCUMENTS

CN  102522833 A  6/2012
JP  2007-521642 A  8/2007
(Continued)

OTHER PUBLICATIONS

International Search Report; PCT/JP2013/077431; dated Nov. 19, 2013.
(Continued)

*Primary Examiner* — Thomas Skibinski
(74) *Attorney, Agent, or Firm* — Studebaker & Brackett PC

(57) ABSTRACT

A power sending loop coil disposed in a power sending device takes out electric energy from DC power and generates periodically-varying electromagnetic field resonance energy in a space. A power receiving loop coil disposed in a power receiving device takes out, as electric energy, the periodically-varying electromagnetic field resonance energy from the space and supplies electric power to a load. The power sending loop coil and the power receiving loop coil are coupled to each other through electromagnetic field resonant coupling, whereby electric power is wirelessly transferred from the power sending device to the power receiving device.

18 Claims, 12 Drawing Sheets

(51) Int. Cl.
*H02J 50/50* (2016.01)
*H02J 5/00* (2016.01)
*H02J 7/02* (2016.01)
*H02M 3/337* (2006.01)
*H02J 50/12* (2016.01)

(58) Field of Classification Search
USPC .................................................. 307/104, 109
See application file for complete search history.

(56) References Cited

U.S. PATENT DOCUMENTS

| | | | |
|---|---|---|---|
| 2008/0211320 | A1 | 9/2008 | Cook et al. |
| 2009/0127937 | A1 | 5/2009 | Widmer et al. |
| 2011/0241440 | A1 | 10/2011 | Sakoda et al. |
| 2011/0266884 | A1 | 11/2011 | Wako et al. |
| 2012/0025623 | A1 | 2/2012 | Low et al. |
| 2012/0049645 | A1* | 3/2012 | Kozakai ............... H04B 5/0037 307/104 |
| 2012/0106103 | A1 | 5/2012 | Nohra |
| 2012/0161696 | A1 | 6/2012 | Cook et al. |
| 2012/0212068 | A1 | 8/2012 | Urano |
| 2013/0300210 | A1* | 11/2013 | Hosotani ............... H02J 5/005 307/104 |
| 2014/0183969 | A1 | 7/2014 | Cook et al. |

FOREIGN PATENT DOCUMENTS

| | | | |
|---|---|---|---|
| JP | 2008-104295 | A | 5/2008 |
| JP | 2008-206327 | A | 9/2008 |
| JP | 2010-141977 | A | 6/2010 |
| JP | 2010-520716 | A | 6/2010 |
| JP | 2010-147420 | A | 7/2010 |
| JP | 2011-508578 | A | 3/2011 |
| JP | 2012-039692 | A | 2/2012 |
| JP | 2012-049434 | A | 3/2012 |
| JP | 2013-546293 | A | 12/2013 |
| WO | 2006/022365 | A1 | 3/2006 |
| WO | 2010/079768 | A1 | 7/2010 |
| WO | 2012/101907 | A1 | 8/2012 |
| WO | 2012/115117 | A1 | 8/2012 |
| WO | WO 2012101907 | A1 * | 8/2012 .............. H02J 5/005 |

OTHER PUBLICATIONS

Written Opinion of the International Searching Authority; PCT/JP2013/077431; dated Nov. 19, 2013.

The Second Office Action issued by the State Intellectual Property Office of People's Republic of China dated May 15, 017, which corresponds to Chinese Patent Application No. 201380053064.1 and is related to U.S. Appl. No. 14/681,993; with English language translation.

An Office Action; "Notice of Reasons for Rejection," issued by the Japanese Patent Office dated Aug. 8, 2017, which corresponds to Japanese Patent Application No. 2016-201530 and is related to U.S. Appl. No. 4/681,993; with English language translation.

Notification of the Third Office Action issued by the State Intellectual Property Office of the People's Republic of China dated Nov. 14, 2017, which corresponds to Chinese Patent Application No. 201380053064.1 and is related to U.S. Appl. No. 14/681,993.

* cited by examiner

WIRELESS POWER TRANSFER APPARATUS

CROSS REFERENCE TO RELATED APPLICATIONS

This application claims benefit of priority to Japanese Patent Application No. 2012-225917 filed Oct. 11, 2012, and to International Patent Application No. PCT/JP2013/077431 filed on Oct. 9, 2013, the entire content of which is incorporated herein by reference.

TECHNICAL FIELD

The present technical field relates to a wireless power transfer apparatus including a power sending device and a power receiving device.

BACKGROUND

Recently, the number of battery-driven electronic devices has increased with not only a demand for reduction in size, weight and power consumption of the electronic devices, but also with an increase in battery capacity. Moreover, data communication between devices within a near range has been practiced wirelessly in an increasing number of applications. Under such a situation, contactless power transmission techniques are also demanded in relation to electric power.

As disclosed in Japanese Unexamined Patent Application Publication No. 2008-206327, for example, a contactless charging system of related art is constituted by a power sending device including a primary coil disposed in a charging stand or the like, and by a portable electronic device including a secondary coil and a chargeable battery. A user places the portable electronic device on the power sending device. Upon the placement of the portable electronic device on the power sending device, the primary coil in the power sending device and the secondary coil in the portable electronic device are brought into a state under coupling through electromagnetic induction coupling (i.e., magnetic coupling). Hence electric power is supplied to the charging device side and the chargeable battery is charged.

SUMMARY

Technical Problem

In the contactless charging system disclosed in Japanese Unexamined Patent Application Publication No. 2008-206327, a power sending coil and a power receiving coil operate as an insulating transformer utilizing the electromagnetic induction, and they are merely employed as a power transformer utilizing the magnetic coupling. In the transformer utilizing the electromagnetic induction, magnetic flux is generated by a current flowing through a primary winding, and the generated magnetic flux is interlinked with a secondary winding to generate a current therein. Therefore, it is important to efficiently carry out conversion from electricity to magnetism and then from magnetism to electricity.

In a wireless power transfer apparatus utilizing the electromagnetic induction, how to increase a degree of magnetic coupling between the primary winding and the secondary winding is important for the purpose of increasing efficiency of power conversion. However, increasing the degree of magnetic coupling in the transformer is difficult in many cases from the necessity of preventing magnetic saturation or from physical restrictions. Consequently, high efficiency of power conversion cannot be obtained.

Meanwhile, research and development of resonant wireless power transfer have been vigorously conducted in recent years. The power transmission experiment reported by MIT (Massachusetts Institute of Technology) in 2007 and carried out on condition of a frequency of 10 MHz and a transmission distance of 2 m has received widespread attention. However, power efficiency was very low, i.e., about 15%. A main reason presumably resides in that a high-frequency AC current is generated by employing a colpitts oscillator. Thus, it is thought that a large amount of electric power is lost in a stage of generating the AC current in a power amplification circuit in the colpitts oscillator. It is not too much to say that the most important issue in the wireless power transfer is to generate the high-frequency AC current at an efficiency as high as possible.

The present disclosure relates to an apparatus for performing wireless power transfer by forming the electromagnetic field resonant coupling. There are the following problems when the wireless power transfer is to be performed through the electromagnetic field resonant coupling.

(1) In the apparatus for performing the wireless power transfer by forming the electromagnetic field resonant coupling, power transmission devices are used to send and receive the electric power. For example, helical coils, each having a complicated structure, is used in the power transmission devices which have been practiced so far. In the electromagnetic field resonant coupling that is formed through resonance at a high frequency, however, a stray capacitance, i.e., a capacitance component structurally contained in the power transmission device, greatly affects the resonant frequency. It is very difficult to manage and adjust the structurally specific stray capacitance in the field of industrial application. This brings about a demand for a technique of performing the wireless power transfer by forming the electromagnetic field resonant coupling with power transmission devices having simple structures.

(2) Power efficiency is defined as a rate of electric power consumed by an objective load with respect to electric power at a power source. When a coil having a large number of turns is used as the power transmission device, the power efficiency is reduced because the equivalent series AC resistance is increased.

(3) When a power amplification circuit is used in an AC power generation source to form the electromagnetic field resonant coupling, a power loss is large in the power amplification circuit, and the power efficiency in generating the AC power is theoretically 50% at maximum in an A-class amplification circuit, for example. Therefore, when the power amplification circuit is used, a wireless power transfer system with very poor power efficiency necessarily results.

An object of the present disclosure is to provide a wireless power transfer apparatus that employs a loop coil as a power transmission device, and that is very simple.

Solution to Problem

The wireless power transfer apparatus according to the present disclosure is constituted as follows.

(1) A wireless power transfer apparatus constituted by a power sending device including a power sending coil, and a power receiving device including a power receiving coil, the wireless power transfer apparatus comprising:
at least one resonant capacitor Cr that is connected equivalently in series to the power sending coil to constitute a power sending-side resonant circuit;

a power sending-side switching circuit including a switching element that is connected to the power sending-side resonant circuit, and that is turned on and off to intermittently apply DC power to the power sending-side resonant circuit and to generate a resonant current in the power sending-side resonant circuit, and a switching control circuit that controls the switching element;

at least one resonant capacitor Crs that is connected equivalently in series to the power receiving coil to constitute a power receiving-side resonant circuit; and a power receiving-side rectification circuit connected to the power receiving-side resonant circuit and including a rectification element that rectifies a resonant current and supplies the current to a load, wherein at least one of the power sending coil and the power receiving coil is a loop coil (a power sending loop coil np or a power receiving loop coil ns), the power sending coil takes out electric energy from the DC power and generates periodically-varying electromagnetic field resonance energy in a space, the power receiving coil takes out, as electric energy, the periodically-varying electromagnetic field resonance energy from the space and supplies electric power to the load, and electric power is transmitted from the power sending device to the power receiving device through electromagnetic field resonant coupling that is formed through a process of equivalently forming a mutual inductance Lm with mutual induction, causing the power sending-side resonant circuit and the power receiving-side resonant circuit to resonate with each other, and generating the resonant current flowing through the mutual inductance Lm.

With the features described above, the electromagnetic field resonant coupling can be formed by employing a simple loop coil without using a complicated coil, and a switching wireless power transfer apparatus can be obtained in a simple structure. Furthermore, since the equivalent series AC resistance of the loop coil is small, a power loss generated by the loop coil is small. Therefore, electric power can be efficiently transmitted from a power sending circuit to a power receiving circuit through the magnetic field resonant coupling, and the efficiency of the wireless power transfer apparatus can be increased.

(2) Preferably, the loop coil is formed in a two-dimensional plane. With that feature, the wireless power transfer apparatus can be constituted in a simple and thin structure.

(3) As the occasion requires, preferably, the loop coil is formed in two two-dimensional planes, which are orthogonal to each other, to constitute the loop coil in a three-dimensional space. With that structure, energy can be easily sent and received in directions of two axes among three xyz-axes, and a degree of freedom in positional relationship between the power sending and receiving devices can be increased to a large extent.

(4) Preferably, the loop coil is formed in three two-dimensional planes, which are orthogonal to one another, to constitute the loop coil in a three-dimensional space. With that structure, energy can be easily sent and received in three normal directions of xyz-axes, and a degree of freedom in positional relationship between the power sending and receiving devices can be increased to a large extent.

(5) As the occasion requires, preferably, the loop coil is formed in a pattern of multiple turns in one two-dimensional plane. With that feature, magnetic energy generated by the loop coil is increased and electromagnetic field resonance energy per unit period is increased, whereby an amount of transmitted power can be increased. As a result, the size and the weight of the wireless power transfer apparatus can be reduced.

(6) Assuming that, when an appropriate load is connected to an output of the power receiving device, fr denotes a resonant frequency at which an input impedance when looking at an entirety of load side from an input of the power sending-side resonant circuit, which is connected to the power sending-side switching circuit, is minimized, and that fs denotes a switching frequency, the switching control circuit is preferably operated on condition of $fs=fr\pm20\%$. With that feature, since the wireless power transfer apparatus is operated with the switching frequency fs set to the vicinity of the resonant frequency fr, resonance energy is increased, and an amount of transmitted energy is increased. As a result, the size and the weight of the wireless power transfer apparatus can be reduced.

(7) Assuming that, when an appropriate load is connected to an output of the power receiving device, fr denotes a resonant frequency at which an input impedance when looking at an entirety of load side from an input of the power sending-side resonant circuit, which is connected to the power sending-side switching circuit, is minimized, and that fs denotes a switching frequency, the switching control circuit is preferably operated on condition of $fs>fr$. With that feature, the input impedance of a multi-resonant circuit when looked at from the switching circuit is made inductive. Therefore, a zero voltage switching (ZVS) operation can be realized in the switching element constituting the power sending circuit. Furthermore, the ZVS operation of the switching element can be performed over an entire load range. Since a switching loss is reduced with the ZVS operation, efficiency can be increased, and the size and the weight of the wireless power transfer apparatus can be reduced.

(8) Preferably, the switching control circuit performs a zero voltage switching operation by controlling the switching element to be turned on when a voltage across the switching element is reduced to a vicinity of zero voltage. With that feature, since the switching element is turned on when the voltage across the switching element is reduced to the vicinity of zero voltage, the switching loss can be further reduced. In addition, since the switching loss is reduced with the ZVS operation, efficiency can be increased, and the size and the weight of the wireless power transfer apparatus can be reduced.

(9) The power receiving-side rectification circuit may be connected, for example, in series to the resonant capacitor constituting the power receiving-side resonant circuit to rectify the current flowing through the resonant capacitor to be output for supply of electric power to the load. With that feature, a large current can be supplied to the load by rectifying the current flowing through the capacitor. Moreover, the withstand voltage of the rectification element can be reduced, and a rectification loss can be reduced. As a result, the efficiency of the wireless power transfer apparatus can be increased, and the size and the weight thereof can be reduced.

(10) The power receiving-side rectification circuit may be connected, for example, in parallel to the resonant capacitor constituting the power receiving-side resonant circuit to take out a current from a voltage, which is applied to the resonant capacitor, and to rectify the current to be output for supply of electric power to the load. With that feature, since a current is taken out from the voltage, which is applied to the resonant capacitor, and is rectified, a large voltage can be supplied to the load. Moreover, a value of the withstand current of the rectification element can be reduced, and the rectification loss can be reduced. As a result, the efficiency of the wireless power transfer apparatus can be increased, and the size and the weight thereof can be reduced.

(11) Preferably, the power receiving-side rectification circuit is, for example, a bridge rectification circuit. With that feature, a bidirectional current generated in the power receiving loop coil can be rectified. Moreover, a value of the withstand current of the rectification element can be reduced. As a result, the efficiency of the wireless power transfer apparatus can be increased, and the size and the weight thereof can be reduced.

(12) Preferably, the power receiving-side rectification circuit is, for example, a half-wave rectification circuit. With that feature, since the power receiving-side rectification circuit can be constituted by one rectification element, the efficiency of the wireless power transfer apparatus can be increased, and the size and the weight thereof can be reduced.

(13) Preferably, the power receiving-side rectification circuit is, for example, a voltage doubler rectification circuit. With that feature, a higher voltage than that generated in the loop coil can be supplied to the load.

(14) Preferably, a resonant frequency of the power sending-side resonant circuit and a resonant frequency of the power receiving-side resonant circuit are matched with each other within a range of ±20%. With that feature, since the switching frequency and the resonant frequency are synchronized with each other, the electromagnetic field resonance energy can be increased. As a result, a larger amount of electric power can be transferred from the power sending circuit to the power receiving circuit.

(15) Preferably, a junction capacitance of the rectification element is utilized as the resonant capacitor or a part of the resonant capacitor. With that feature, a failure in a power transmission operation can be avoided. Moreover, since the number of components is reduced, the size and the weight of the wireless power transfer apparatus can be reduced.

(16) Preferably, a stray capacitance of the loop coil is utilized as whole or a part of the resonant capacitor. With that feature, radiation of undesired electromagnetic waves can be suppressed. Moreover, since the number of components is reduced, the size and the weight of the wireless power transfer apparatus can be reduced.

(17) Preferably, the switching element is an FET, and the power sending-side switching circuit includes a parasitic capacitance of the FET and an antiparallel diode. With that feature, since the number of components is reduced, the efficiency of the wireless power transfer apparatus can be increased, and the size and the weight thereof can be reduced.

(18) Preferably, the power sending-side switching circuit is constituted, for example, in a half-bridge arrangement. With that feature, the voltage applied to each switching element is reduced in comparison with the case using one switching element. As a result, the efficiency of the wireless power transfer apparatus can be increased, and the size and the weight thereof can be reduced.

(19) Preferably, the power sending-side switching circuit is constituted, for example, in a full-bridge arrangement. With that feature, the voltage applied to each switching element is further reduced in comparison with the case of the half-bridge arrangement. As a result, the efficiency of the wireless power transfer apparatus can be increased, and the size and the weight thereof can be reduced.

(20) Preferably, the power receiving-side rectification circuit is, for example, a synchronous rectification circuit including a switching element. With that feature, the rectification loss can be reduced.

Advantageous Effects of Disclosure

The following advantageous effects are obtained with the present disclosure.

(1) The electromagnetic field resonant coupling can be formed by employing a simple loop coil without using a complicated coil, and a switching wireless power transfer apparatus can be obtained in a simple structure.

(2) Since the equivalent series AC resistance of the loop coil is small, a power loss generated by the loop coil is small. Therefore, electric power can be efficiently transmitted from the power sending circuit to the power receiving circuit through the magnetic field resonant coupling, and the efficiency of the wireless power transfer apparatus can be increased.

(3) The transmitted power can be controlled by the switching control circuit that controls the switching operation.

DETAILED DESCRIPTION

First Embodiment

Figure 1A:
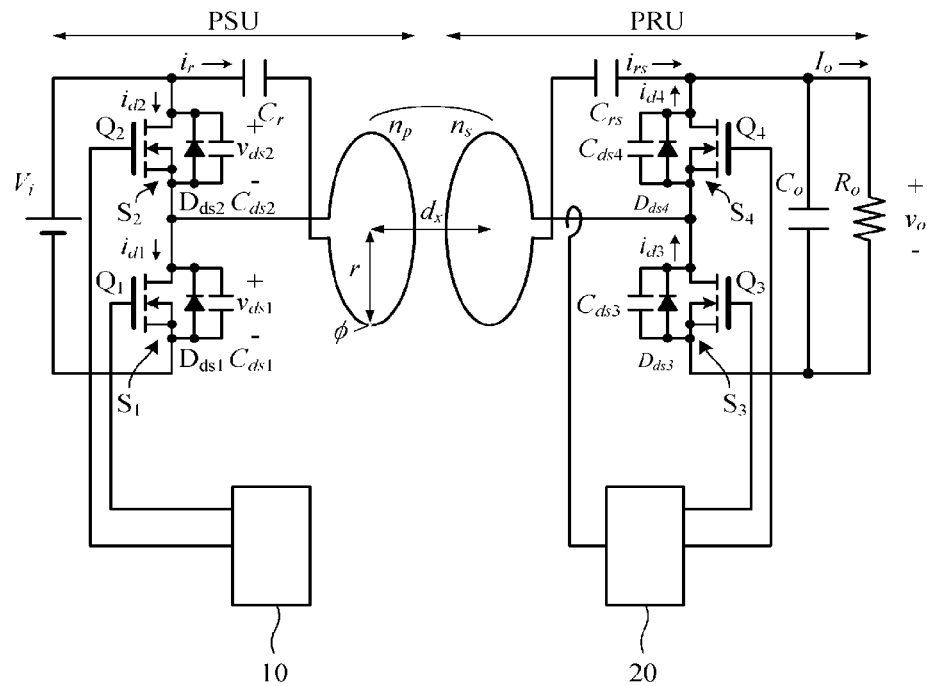
FIG. 1(A) is a circuit diagram of a wireless power transfer apparatus 101 according to a first embodiment.
Figure 1B:
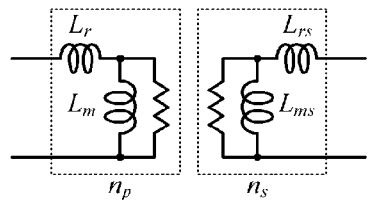
FIG. 1(B) is a circuit diagram of a power sending loop coil and a power receiving loop coil from a part of FIG. 1(A).

FIG. 1(A) is a circuit diagram of a wireless power transfer apparatus 101 according to a first embodiment. FIG. 1(B) is an equivalent circuit diagram of a part of FIG. 1(A).

The wireless power transfer apparatus 101 is constituted by a power sending device PSU including a power sending loop coil np, and a power receiving device PRU including a power receiving loop coil ns. The wireless power transfer apparatus 101 is a system that includes an input power source Vi in an input unit of the power sending device PSU, and that wirelessly transfers electric power, i.e., stable DC energy, to a load Ro of the power receiving device PRU.

The power sending device PSU includes the power sending loop coil np, a resonant capacitor Cr, and a power sending-side switching circuit that includes switching elements Q1 and Q2 and a switching control circuit 10 for controlling the switching elements Q1 and Q2.

The power sending loop coil np and the resonance capacitor Cr constitute a "power sending-side resonant circuit".

A parallel-connected circuit of the switching element Q1, an antiparallel diode Dds1, and a parasitic capacitor Cds1 constitutes a switch circuit S1. Similarly, a parallel-connected circuit of the switching element Q2, an antiparallel diode Dds2, and a parasitic capacitor Cds2 constitutes a switch circuit S2. Hereinafter, the antiparallel diode (parasitic diode) is referred to simply as a "diode".

The switching control circuit 10 is connected to the power sending-side resonant circuit to alternately turn on and off the switch circuits S1 and S2 at a predetermined switching frequency such that DC power is intermittently applied to the power sending-side resonant circuit to generate a resonance current in the power sending-side resonant circuit.

In the illustrated example, the power sending-side switching circuit constitutes a half-bridge circuit including the two switch circuits S1 and S2.

The power receiving device PRU includes the power receiving loop coil ns, a resonant capacitor Crs, a power receiving-side switching circuit that includes switching elements Q3 and Q4 and a switching control circuit 20 for controlling the switching elements Q3 and Q4, and a smoothing capacitor Co.

The power receiving loop coil ns and the resonance capacitor Crs, which is connected equivalently in series to the former, constitute a "power receiving-side resonant circuit".

A parallel-connected circuit of the switching element Q3, a diode Dds3, and a capacitor Cds3 constitutes a switch circuit S3. Similarly, a parallel-connected circuit of the switching element Q4, a diode Dds4, and a capacitor Cds4 constitutes a switch circuit S4.

The switching control circuit 20 detects a current flowing through the power receiving loop coil ns and alternately turns on and off the switching elements Q3 and Q4 in synchronism with reversing of the polarity of the detected current. As a result, a resonant current flowing through the power receiving-side resonant circuit is rectified in synchronism with change of a current flowing direction, and the current is supplied to the load. The switch circuits S3 and S4 and the switching control circuit 20 constitute a power receiving-side rectification circuit. The smoothing capacitor Co smoothens a voltage rectified by the power receiving-side rectification circuit.

The switching control circuit 10 on the power sending side operates by employing the input power source Vi as a power source. The switching control circuit 20 on the power receiving side operates by employing, as a power source, the voltage generated in the power receiving-side resonant circuit, or the voltage output to the load, or a separately-prepared power supply source, for example.

FIG. 1(B) is an equivalent circuit diagram of a circuit constituted by the power sending loop coil np and the power receiving loop coil ns. The power sending loop coil np and the power receiving loop coil ns are each represented by an equivalent circuit including an ideal transformer, a mutual inductance, and a leakage inductance. Thus, the power sending loop coil np is represented by a mutual inductance Lm and a leakage inductance Lr. Similarly, the power receiving loop coil ns is represented by a mutual inductance Lms and a leakage inductance Lrs. It can also be thought that, though not explicitly illustrated in FIG. 1(B), an equivalent mutual capacitance is further generated between the power sending loop coil np and the power receiving loop coil ns.

The electromagnetic field resonant coupling is generated with the mutual inductances (and the mutual capacitance) equivalently formed between the power sending loop coil np and the power receiving loop coil ns. As a result, the power sending-side resonant circuit and the power receiving-side resonant circuit are resonated with each other, and electric power is transmitted from the power sending device to the power receiving device. On the other hand, energy (reactive power) reflected from the power sending device without being transmitted is preserved as resonance energy in the power sending-side resonant circuit. Furthermore, part (reactive power) of energy received by the power receiving device, the part being reflected without being supplied to the output, is preserved as resonance energy in the power receiving-side resonant circuit. Thus, of the input power, the reflected power having been not output as the transmitted power can be preserved as resonance energy without causing an energy loss.

With the resonance phenomenon, an input current $iac_{in}(t)$ to the electromagnetic field resonant coupling circuits can be approximately expressed by the following formula, given that an amplitude of the resonant current is denoted by Iac.

$$iac_{in}(t) = Iac\ sin(\omega r\ t)$$

where $\omega r = 2\pi/Tr$ (Tr: resonant period)

The sine-wave current $iac_{in}(t)$ is applied between DC-power input terminals of the power sending device. Although currents having various frequency components are going to flow into between the input terminals, currents (waveforms) having high-order frequency components exhibiting large impedances are cut by the electromagnetic field resonant coupling circuits, and only the waveform of the resonant current containing mainly a switching frequency component is allowed to flow due to the resonant operation. Hence electric power can be transmitted at high efficiency. In addition, undesired radiation with harmonic components is hardly generated.

For example, when electric power of 0.1 to 80 W at 7 to 13 MHz is wirelessly transferred through a distance of 2 to 50 mm, the power sending loop coil np has a radius r, e.g., 25 to 75 mm, and a conductor wire has a diameter φ in order of, e.g., 1 to 2 mm.

The above-mentioned loop coil can be constituted by forming a metal wire into the shape of a loop, or by forming a loop-shaped conductor pattern on a circuit substrate.

Specific operations of the wireless power transfer apparatus 101, illustrated in FIG. 1(A), are as follows.

(1) The power sending-side resonant circuit is constituted by the leakage inductance Lr of the power sending loop coil np, and the resonant capacitor Cr connected equivalently in series to the leakage inductance Lr.

Since the switching elements Q1 and Q2 electrically directly connected to the power sending loop coil np are turned on and off by the switching control circuit, the DC power is intermittently applied to the power sending-side resonant circuit, whereby the resonant current is generated. Thus, the power sending loop coil np takes out electric energy from the DC power and generates periodically-varying electromagnetic field resonance energy in a space.

The power receiving-side resonant circuit is constituted by the leakage inductance Lrs of the power receiving loop coil ns, and the resonant capacitor Crs connected equivalently in series to the leakage inductance Lrs.

A resonant frequency of the power sending-side resonant circuit and a resonant frequency of the power receiving-side resonant circuit are matched with each other within a range of ±20%. By making the resonant frequency of the power sending-side resonant circuit and the resonant frequency of the power receiving-side resonant circuit accurately matched with each other, it is possible to more easily specify a resonant frequency forming the electromagnetic field resonance, to prevent the occurrence of electromagnetic noise of undesired frequency components, and to facilitate design of the wireless power transfer apparatus.

The power receiving loop coil ns takes out, as electric energy, the periodically-varying electromagnetic field resonance energy from the space, and supplies the electric energy to the load. The electromagnetic field resonant coupling is formed between the power sending loop coil np and the power receiving loop coil ns, and the mutual inductances are equivalently formed between the power sending loop coil np and the power receiving loop coil ns through mutual induction. The power sending-side resonant circuit and the power receiving-side resonant circuit are resonated with other, and electric power is transmitted from the power sending device PSU to the power receiving device PRU through the electromagnetic field resonant coupling with the resonant current flowing through the mutual inductances.

By synchronizing a switching frequency fs with a resonance frequency fr of a multi-resonant circuit that is formed by the electromagnetic field resonant coupling between the power sending-side resonant circuit and the power receiving-side resonant circuit, the electromagnetic field resonant coupling is formed, and electric power is wirelessly transmitted from the power sending device PSU to the power receiving device PRU.

(2) The transmitted power is controlled by the switching control circuit 10 that controls the switching operation.

(3) The switching elements Q1, Q2, Q3 and Q4 performs the ZVS operation in which each switching element is turned on when a voltage across the switching element is reduced to near zero.

Figure 2:
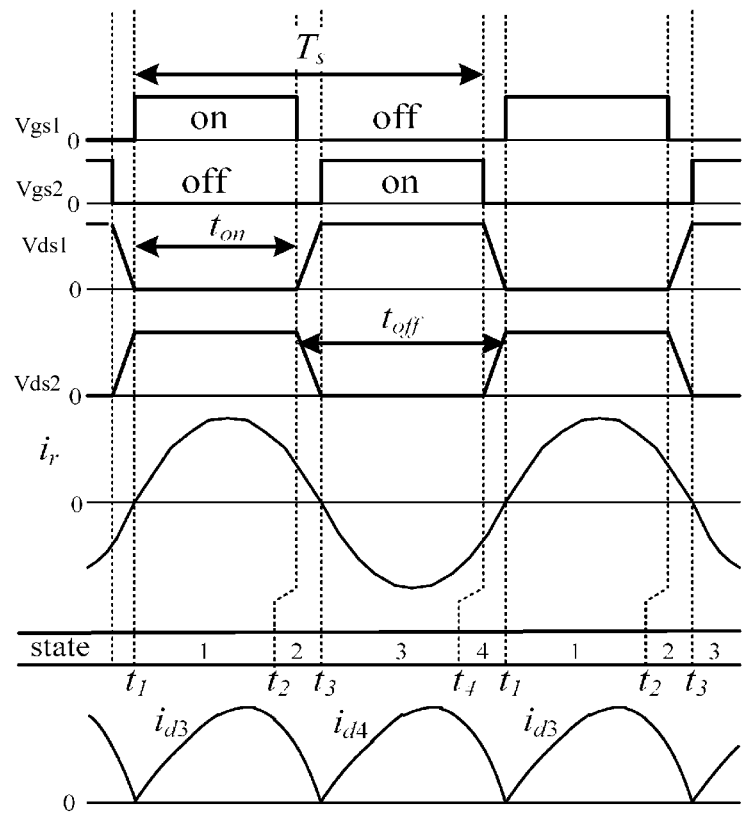
FIG. 2 is a chart depicting waveforms at various points in FIG. 1(A).

The detailed operation of the wireless power transfer apparatus 101, illustrated in FIG. 1(A), will be described below with reference to FIG. 2. FIG. 2 is a chart depicting waveforms at various points in FIG. 1(A).

Assume that the mutual inductance of the power sending loop coil np is denoted by Lm, the leakage inductance of the power sending loop coil np is denoted by Lr, the mutual inductance of the power receiving loop coil ns is denoted by Lms, and the leakage inductance of the power receiving loop coil ns is denoted by Lrs. Furthermore, assume that gate-source voltages of the switching elements Q1 and Q2 are denoted respectively by vgs1 and vgs2, and drain-source voltages thereof are denoted respectively by vds1 and vds2.

The switching elements Q1 and Q2 are alternately turned on and off with interposition of a short dead time during which both the switching elements are turned off. The switching elements Q1 and Q2 perform the ZVS operation by commutating respective currents that flow through Q1 and Q2 during a period of the dead time. The operations in successive states in one switching period are as follows.

(1) State 1 Time t1 to t2

First, the diode Dds1 is conducted. The ZVS operation is performed with the switching element Q1 turned on during a conduction period of the diode Dds1, and the switching element Q1 is conducted. The equivalent mutual inductances Lm and Lms are formed through the mutual induction between the power sending loop coil np and the power receiving loop coil ns. In the multi-resonant circuit made up of Cr, Lr, Lm, Lms, Crs and Lrs, the power sending-side resonant circuit and the power receiving-side resonant circuit are resonated with each other, thereby causing resonant currents to flow through the mutual inductances Lm and Lms and forming the electromagnetic field resonant coupling. As a result, electric power is transmitted from the power sending circuit to the power receiving circuit. On the power sending side, the resonant current flows through the capacitor Cr and the leakage inductance Lr. On the power receiving side, the resonant current flows through the capacitor Crs and the leakage inductance Lrs. After being rectified by the switching elements Q3 and Q4, electric power is supplied to the load.

The wireless power transfer apparatus 101 comes into a state 2 after the switching element Q1 has been turned off.

(2) State 2 Time t2 to t3

In the power sending device PSU, the parasitic capacitor Cds1 is charged by a current it having flowed through the leakage inductance Lr, and the parasitic capacitor Cds2 is discharged. When the voltage vds1 becomes a voltage Vi and the voltage vds2 becomes 0 V, the diode Dds2 is conducted, and the wireless power transfer apparatus 101 comes into a state 3.

(3) State 3 Time t3 to t4

First, the diode Dds2 is conducted. The ZVS operation is performed with the switching element Q2 turned on during a conduction period of the diode Dds2, and the switching element Q2 is conducted. The equivalent mutual inductances Lm and Lms are formed through the mutual induction between the power sending loop coil np and the power receiving loop coil ns. In the multi-resonant circuit made up of Cr, Lr, Lm, Lms, Crs and Lrs, the power sending-side resonant circuit and the power receiving-side resonant circuit are resonated with each other, thereby causing resonant currents to flow through the mutual inductances Lm and Lms and forming the electromagnetic field resonant coupling. As a result, electric power is transmitted from the power sending circuit to the power receiving circuit. On the power sending side, the resonant current flows through the capacitor Cr and the leakage inductance Lr. On the power receiving side, the resonant current flows through the capacitor Crs and the leakage inductance Lrs. After being rectified by the switching elements Q3 and Q4, electric power is supplied to the load.

The wireless power transfer apparatus 101 comes into a state 4 after the switching element Q2 has been turned off.

(4) State 4 Time t4 to t1

In the power sending device PSU, the parasitic capacitor Cds1 is discharged, and the parasitic capacitor Cds2 is charged by a current it having flowed through the leakage inductance Lr. When the voltage vds1 becomes 0 V and the voltage vds2 becomes Vi, the diode Dds1 is conducted, and the wireless power transfer apparatus 101 comes into state 1 again.

Thereafter, the states 1 to 4 are repeated periodically.

The first embodiment can provide the following advantageous effects.

(1) The electromagnetic field resonant coupling can be formed by employing simple loop coils without using complicated coils, and a switching wireless power transfer apparatus can be obtained in a simple structure.

(2) Since the equivalent series AC resistance of each of the loop coils np and ns is small, a power loss generated by the loop coil is small. Therefore, electric power can be efficiently transmitted from the power sending circuit to the power receiving circuit through the magnetic field resonant coupling, and the efficiency of the wireless power transfer apparatus can be increased.

(3) Since electromagnetic field resonant coupling is formed by synchronizing the switching frequency fs with the resonance frequency fr, electric power can be efficiently transmitted from the power sending device to the power receiving device in a wireless manner.

(4) The transmitted power can be controlled by adjusting, e.g., the switching frequency, a duty ratio in the switching period, or intermittence of the switching operation with the switching control circuit 10 that controls the switching operation.

(5) Since the switching element performs the ZVS operation, a power loss of the switching element can be reduced greatly.

(6) Since the power receiving device employs the synchronous rectification circuit using the switching element that has small on-resistance, a rectification loss can be reduced in comparison with the case using a diode that has a large forward voltage drop.

(7) Since the switching control circuit 20 can control the operation of the synchronous rectification circuit on the power receiving device side, the transmitted power can be adjusted not only in the power sending device side, but also in the power receiving device side, for example, by controlling the operation frequency of the synchronous rectification circuit in the power receiving device side, adjusting a rectification period, or intermittently adjusting the operation of the synchronous rectification circuit.

(8) On the power receiving device side, the control circuit can be operated by the received power. Therefore, a power source is not required to be disposed on the power receiving device side, whereby the size and the weight of the device can be reduced.

While, in the example illustrated in FIG. 1(A), the switching control circuit 20 detects the current flowing through the power receiving loop coil ns and alternately turns on and off the switching elements Q3 and Q4 in synchronism with reversing of the polarity of the detected current, the arrangement may be modified as follows. A switching timing signal for the switching elements Q1 and Q2 on the power sending device side is transmitted from the power sending device PSU to the power receiving device PRU, and the switching elements Q3 and Q4 are driven in the power receiving device PRU in synchronism with the switching timing of the switching elements Q1 and Q2.

Second Embodiment

In a wireless power transfer apparatus according to a second embodiment, either or both of a power sending loop coil and a power receiving loop coil are each formed in two two-dimensional planes, which are orthogonal to each other, to constitute a loop coil in a three-dimensional space.

Figure 3:
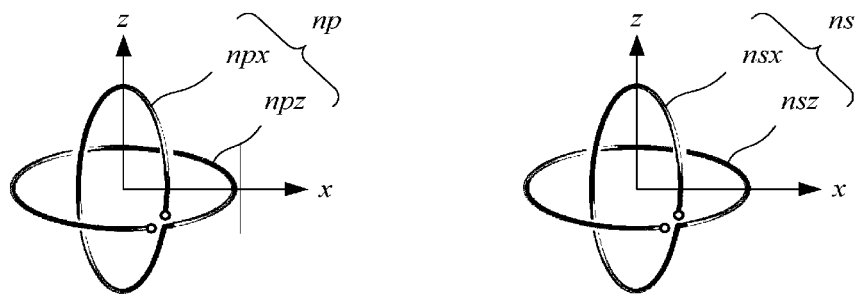
FIG. 3 illustrates structures of a power sending loop coil and a power receiving loop coil in a wireless power transfer apparatus according to a second embodiment.

FIG. 3 illustrates structures of the power sending loop coil and the power receiving loop coil in the wireless power transfer apparatus according to the second embodiment. The power sending loop coil np is constituted by a loop coil npx that is formed in a plane (y-z plane) with an x-axis defining a normal line to the relevant plane, and a loop coil npz that is formed in a plane (x-y plane) with a z-axis defining a normal line to the relevant plane. Similarly, the power receiving loop coil ns is constituted by a loop coil nsx that is formed in a plane (y-z plane) with an x-axis defining a normal line to the relevant plane, and a loop coil nsz that is formed in a plane (x-y plane) with a z-axis defining a normal line to the relevant plane.

In the second embodiment, because a resonant current flows through the loop coil in the three-dimensional space, the loop coil being constituted in the two two-dimensional planes orthogonal to each other, electromagnetic fields periodically varying while keeping an orthogonal relation, i.e., orthogonal varying electromagnetic fields, are formed in two planes. Therefore, energy can be easily sent and received along two of three xyz-axes, and a degree of freedom in positions of the power sending device and the power receiving device, particularly, with respect to those two axes can be increased to a large extent.

It is to be noted that only one of the power sending loop coil and the power receiving loop coil may be formed in the two two-dimensional planes, which are orthogonal to each other, to constitute a loop coil in the three-dimensional space, whereas the other loop coil may be a loop coil formed in one two-dimensional plane.

While, in the example illustrated in FIG. 3, two loop coils having loop surfaces orthogonal to each other are connected in series, the two loop coils may be connected in parallel as required.

Third Embodiment

In a wireless power transfer apparatus according to a third embodiment, the other or both of a power sending loop coil and a power receiving loop coil are each formed in three two-dimensional planes, which are orthogonal to one another, to constitute a loop coil in a three-dimensional space.

Figure 4:
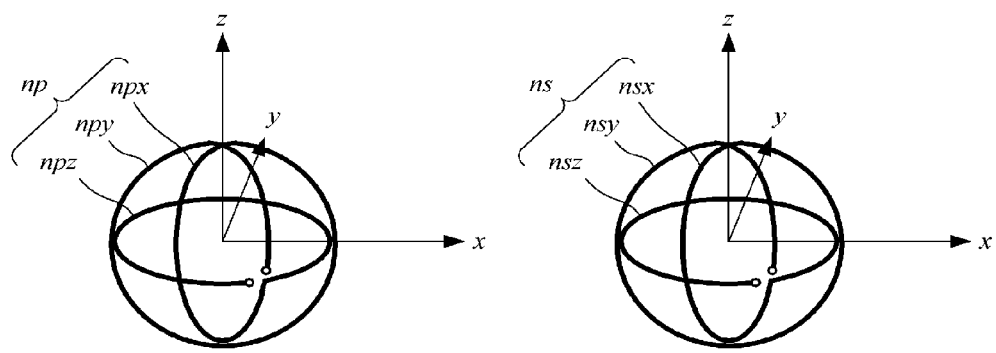
FIG. 4 illustrates structures of a power sending loop coil and a power receiving loop coil in a wireless power transfer apparatus according to a third embodiment.

FIG. 4 illustrates structures of the power sending loop coil and the power receiving loop coil in the wireless power transfer apparatus according to the third embodiment. The power sending loop coil np is constituted by a loop coil npx that is formed in a plane (y-z plane) with an x-axis defining a normal line to the relevant plane, a loop coil npy that is formed in a plane (x-z plane) with a y-axis defining a normal line to the relevant plane, and a loop coil npz that is formed in a plane (x-y plane) with a z-axis defining a normal line to the relevant plane. Similarly, the power receiving loop coil ns is constituted by a loop coil nsx that is formed in a plane (y-z plane) with an x-axis defining a normal line to the relevant plane, a loop coil nsy that is formed in a plane (x-z plane) with a y-axis defining a normal line to the relevant plane, and a loop coil nsz that is formed in a plane (x-y plane) with a z-axis defining a normal line to the relevant plane.

In the third embodiment, because a resonant current flows through the loop coil in the three-dimensional space, the loop coil being constituted in the three two-dimensional planes orthogonal to one another, electromagnetic fields periodically varying while keeping an orthogonal relation are formed in three planes. Therefore, energy can be easily sent and received along three xyz-axes, and a degree of freedom in positional relationship between the power sending device and the power receiving device can be increased to a large extent.

It is to be noted that only one of the power sending loop coil and the power receiving loop coil may be formed on the three two-dimensional planes, which are orthogonal to one another, to constitute a loop coil in the three-dimensional space, whereas the other loop coil may be a loop coil that is formed in one two-dimensional plane, or a loop coil in the three-dimensional space, which is formed in two planes.

While, in the example illustrated in FIG. 4, three loop coils having loop surfaces orthogonal to one another are connected in series, the three loop coils may be connected in parallel as required.

Fourth Embodiment

In a wireless power transfer apparatus according to a fourth embodiment, a power sending loop coil and a power receiving loop coil are each formed in a pattern of multiple turns in one two-dimensional plane.

Figure 5:
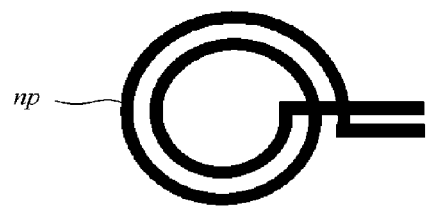
FIG. 5 illustrates structures of a power sending loop coil np and a power receiving loop coil ns in a wireless power transfer apparatus according to a fourth embodiment.
Figure 5:
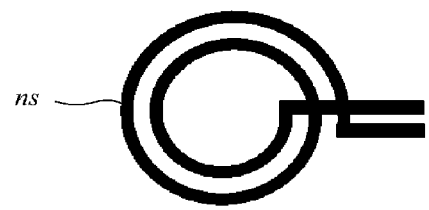

FIG. 5 illustrates structures of a power sending loop coil np and a power receiving loop coil ns in the wireless power transfer apparatus according to the fourth embodiment. The power sending loop coil np and the power receiving loop coil ns are each formed in one two-dimensional plane in a pattern of two turns. Because the power sending loop coil and the power receiving loop coil are each formed in a pattern of multiple turns, a stray capacitance can be generated in the loop coil depending on a pitch width of the turns. By employing the generated stray capacitance as the whole or a part of a resonant capacitor, it is possible to eliminate the necessity of the resonant capacitor that is needed as a separate component, or to reduce a capacitance value of the resonant capacitor.

Figure 6:
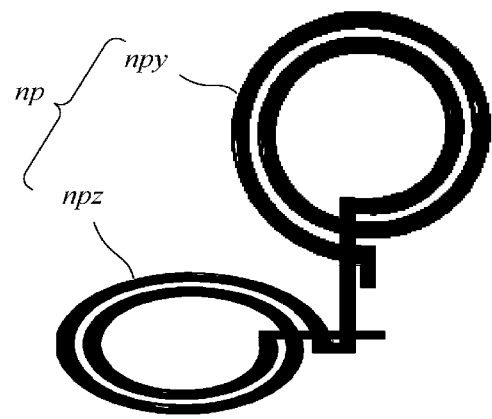
FIG. 6 illustrates structures of another power sending loop coil np and another power receiving coil ns in a wireless power transfer apparatus according to the fourth embodiment.
Figure 6:
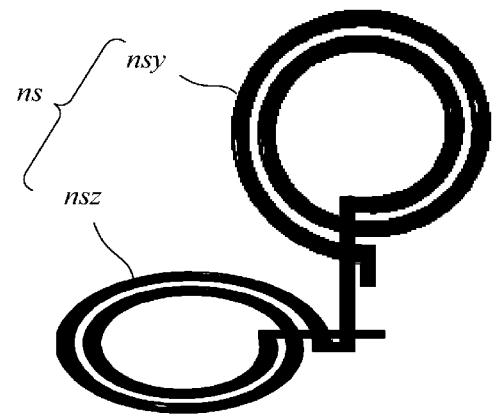

FIG. 6 illustrates structures of another power sending loop coil np and another power receiving loop coil ns in the wireless power transfer apparatus according to the fourth embodiment. In an example illustrated in FIG. 6, the other or both of the power sending loop coil and the power receiving loop coil are each formed in two two-dimensional planes, which are orthogonal to each other, to constitute a loop coil in a three-dimensional space.

With the arrangement described above, magnetic energy generated by the loop coil is increased and electromagnetic field resonance energy per unit period is increased, whereby an amount of transmitted power can be increased. As a result, the size and the weight of the wireless power transfer apparatus can be reduced.

Fifth Embodiment

A switching control circuit in a wireless power transfer apparatus according to a fifth embodiment is operated on condition of fs=fr±20%, assuming that, when an appropriate load is connected to an output of a power receiving circuit, fr denotes a resonant frequency (resonance frequency) at which an input impedance when looking at the entirety of the load side from an input of a power sending-side resonant circuit, which is connected to the power sending-side switching circuit, is minimized, and that fs denotes a switching frequency. In other words, the switching control circuit is operated such that the switching frequency fs is set to the vicinity of the resonant frequency fr. In an electromagnetic field resonant system, because the input impedance is abruptly reduced near the resonant frequency fr, the amplitude of a resonant current can be increased there. Accordingly, it is possible, near the resonant frequency fr, to increase electromagnetic energy handled per unit oscillation, to transfer a larger amount of electric power, and to transmit electric power with higher power efficiency. From the viewpoint of practical operation, the switching frequency fs is preferably set to about fs=fr±20% with respect to the resonant frequency fr at which the input impedance is minimized.

Figure 7:
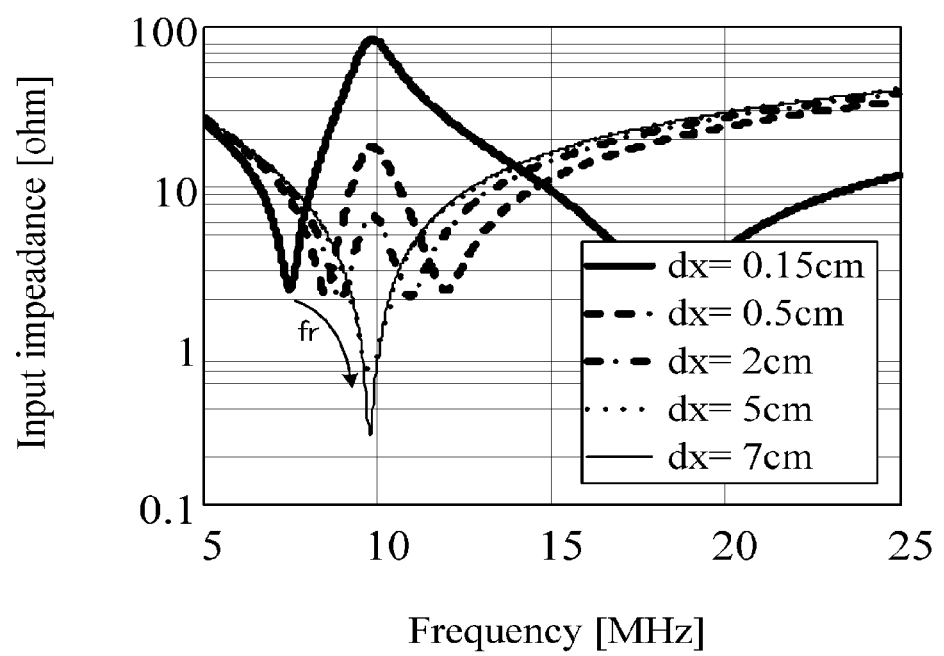
FIG. 7 is a graph depicting frequency characteristics of an input impedance when looking at the entirety of the load side from an input of a power sending-side resonant circuit in a wireless power transfer apparatus according to a fifth embodiment.

FIG. 7 is a graph depicting frequency characteristics of an input impedance when looking at the entirety of the load side from the input of the power sending-side resonant circuit in the wireless power transfer apparatus according to the fifth embodiment. Here, the resonant capacitors Cr and Crs are set to values at which the resonant frequency is near 10 MHz. When a load resistance is set to Ro=10 Ω and a power transmission distance dx is changed in order of 0.15, 0.5, 2.0, 5.0, and 7.0 cm, the input impedance and the resonant frequency fr at which the input impedance is minimized vary as denoted by an arrow in FIG. 7.

In the case of the power transmission distance dx=7 cm (70 mm), for example, the resonant frequency is fr≈10 MHz, and hence the switching frequency fs is set to 10 MHz, for example.

Thus, by operating the wireless power transfer apparatus with the switching frequency fs set to the vicinity of the resonant frequency fr, resonance occurs in a state where the resonant frequency fr at which the input impedance is minimized and the switching frequency fs are close to each other. Accordingly, resonance energy in the power sending-side resonant circuit and the power receiving-side resonant circuit is increased, and an amount of transmitted energy is increased. As a result, the size and the weight of the wireless power transfer apparatus can be reduced.

Sixth Embodiment

A switching control circuit in a wireless power transfer apparatus according to a sixth embodiment is operated in a state where the resonant frequency fr is lower than the switching frequency fs. In other words, the input impedance of a multi-resonant circuit when looked from the switching circuit is made inductive.

Figure 8:
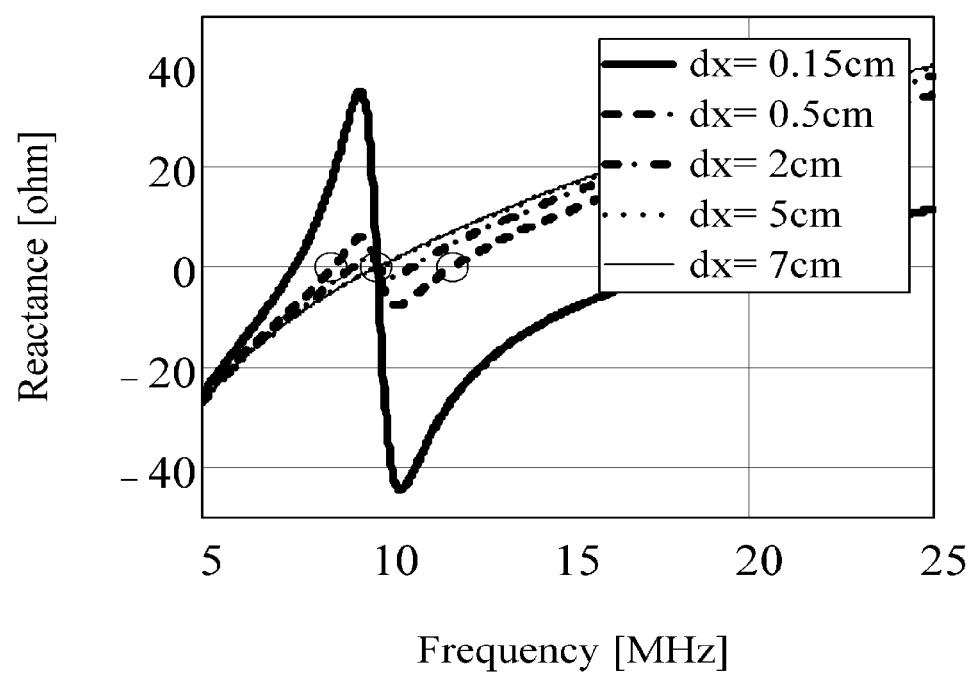
FIG. 8 is a graph depicting frequency characteristics of reactance of an input impedance when looking at the entirety of the load side from an input of a power sending-side resonant circuit in a wireless power transfer apparatus according to a sixth embodiment.

FIG. 8 is a graph depicting frequency characteristics of reactance of an input impedance when looking at the entirety of the load side from an input of a power sending-side resonant circuit in the wireless power transfer apparatus according to the sixth embodiment. Here, the resonant capacitors Cr and Crs are set to values at which the resonant frequency is near 10 MHz. When the load resistance is set to Ro=10 Ω and the power transmission distance dx is changed in order of 0.15, 0.5, 2.0, 5.0, and 7.0 cm, the reactance varies as depicted in FIG. 8.

As seen from FIG. 8, with the change of the distance dx, the frequency characteristics vary from a double-peak characteristic having two frequencies at which the reactance becomes 0, to a single-peak characteristic having one frequency at which the reactance becomes 0. Looking at the reactance of the input impedance, it is seen that inductive property and capacitive property are exchanged at three frequencies. Each of three circles in FIG. 8 denotes the frequency at which inductive property and capacitive property are exchanged in the case of dx=0.5 cm. In order to realize the ZVS operation, it is required to make the input impedance inductive, and to generate a current delayed with respect to a voltage. The delayed current serves to charge and discharge the parasitic capacitors Cds1 and Cds2 of the switching elements (FETs) in the dead time. For that reason, in the double-peak characteristic providing large magnetic coupling, for example, the operation switching frequency fs needs to be set within a frequency range where the input impedance is inductive.

By setting the switching frequency as described above, the ZVS operation of the switching element can be performed over an entire load range. Accordingly, a power loss of the switching element can be reduced greatly. Moreover, since the switching loss is reduced, efficiency can be increased, and the size and the weight of the wireless power transfer apparatus can be reduced.

Seventh Embodiment

In a seventh embodiment, regarding the wireless power transfer apparatus in which the power receiving-side rectification circuit is connected in series to the resonant capacitor Crs constituting the power receiving-side resonant circuit to rectify the current flowing through the resonant capacitor Crs to be output for supply of electric power to the load, other types of wireless power transfer apparatus, which are different from that illustrated in the first embodiment, will be described in particular with reference to FIGS. 9 to 15.

FIGS. 9 to 15 are each a circuit diagram of the wireless power transfer apparatus according to the seventh embodiment. An antiparallel diode and a parasitic capacitor of each switching element are not illustrated.

Figure 9:
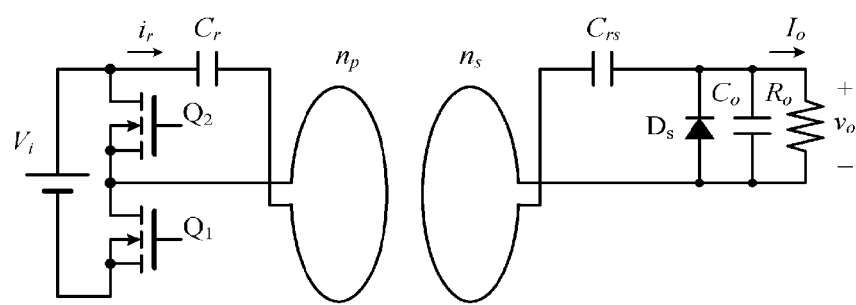
FIG. 9 is a circuit diagram of a wireless power transfer apparatus according to a seventh embodiment.

In FIG. 9, the power receiving-side rectification circuit is a half-wave rectification circuit. A diode Ds rectifies the current flowing through the resonant capacitor Crs and supplies the rectified current to the load.

Figure 10:
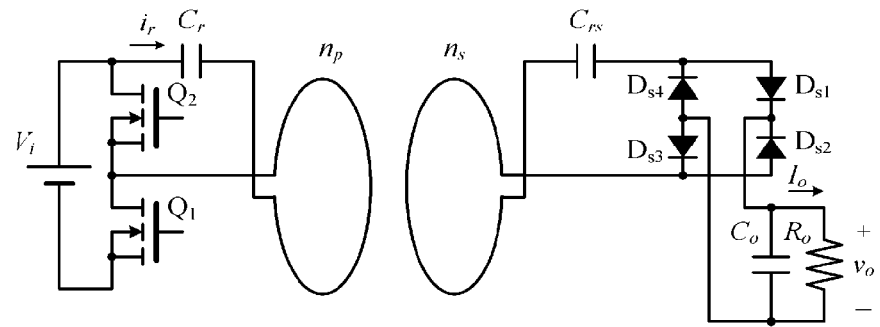
FIG. 10 is a circuit diagram of another wireless power transfer apparatus according to the seventh embodiment.

In FIG. 10, the power receiving-side rectification circuit is a diode bridge circuit constituted by diodes Ds1, Ds2, Ds3, and Ds4.

Figure 11:
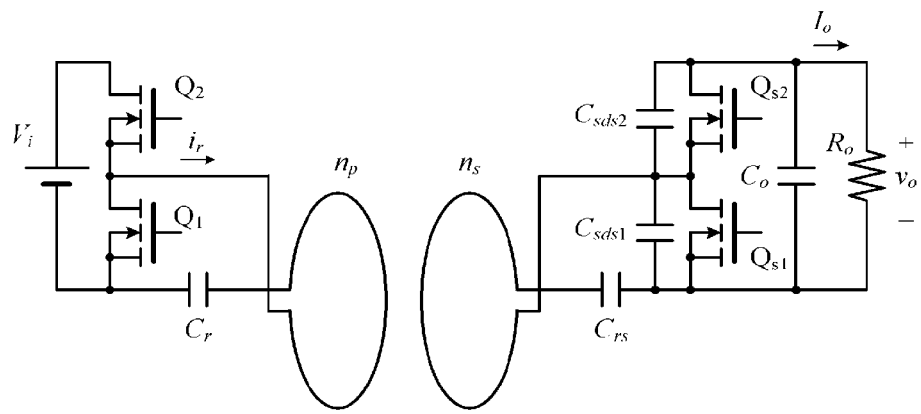
FIG. 11 is a circuit diagram of still another wireless power transfer apparatus according to the seventh embodiment.

In FIG. 11, the power receiving-side rectification circuit is a voltage doubler synchronous rectification circuit. The resonant capacitors Cr and Crs are disposed at different positions from those in the first embodiment. Resonant capacitors Csds1 and Csds2 are connected in parallel to switching elements Qs1 and Qs2 for synchronous rectification, respectively. With such an arrangement, a higher output voltage can be obtained with voltage doubler rectification, and parasitic capacitors of the switching elements Qs1 and Qs2 can be used as the resonant capacitors Csds1 and Csds2, respectively.

Figure 12:
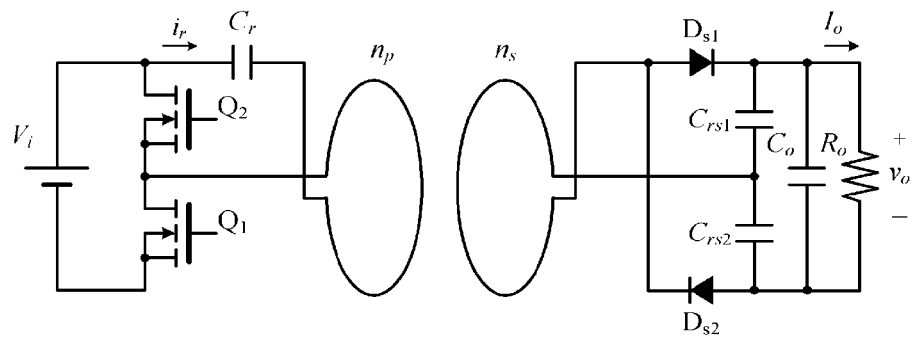
FIG. 12 is a circuit diagram of still another wireless power transfer apparatus according to the seventh embodiment.

In FIG. 12, the power receiving-side rectification circuit is a voltage doubler rectification circuit. Diodes Ds1 and Ds2 rectify respective currents flowing through resonant capacitors Crs1 and Crs2, and supply a doubled voltage to the load.

Figure 13:
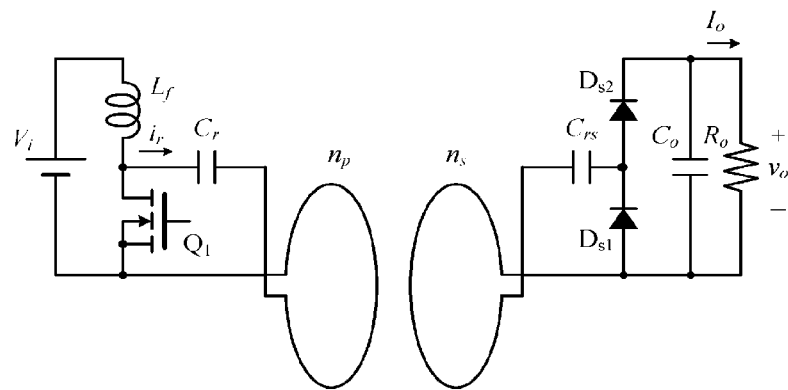
FIG. 13 is a circuit diagram of still another wireless power transfer apparatus according to the seventh embodiment.
Figure 14:
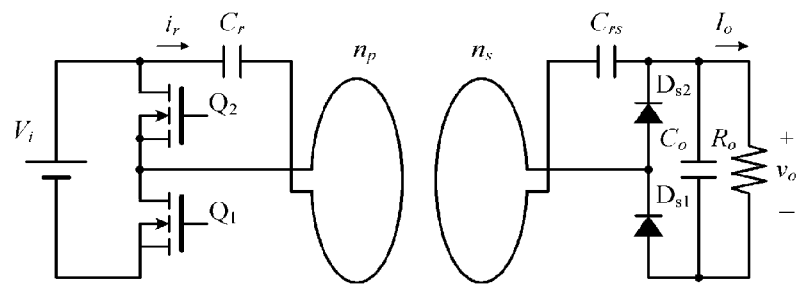
FIG. 14 is a circuit diagram of still another wireless power transfer apparatus according to the seventh embodiment.

In each of FIGS. 13 and 14, the power receiving-side rectification circuit is a voltage doubler rectification circuit. Diodes Ds1 and Ds2 rectify the current flowing through the resonant capacitor Crs while doubling a voltage, and supply the doubled voltage to the load. An example illustrated in FIG. 13 includes, an inductor Lf having such an inductance value as being able to generate, from an input DC voltage, a current source that can be relatively regarded as a DC current with respect to an AC current supplied to the power sending loop coil np, and further includes only one switching element Q1 on the power sending side. An inductance value of the inductor Lf is sufficiently larger than that of the power sending loop coil np, and it exhibits a high impedance at the switching frequency. Thus, variation of a current flowing through the inductor Lf is sufficiently small.

Figure 15:
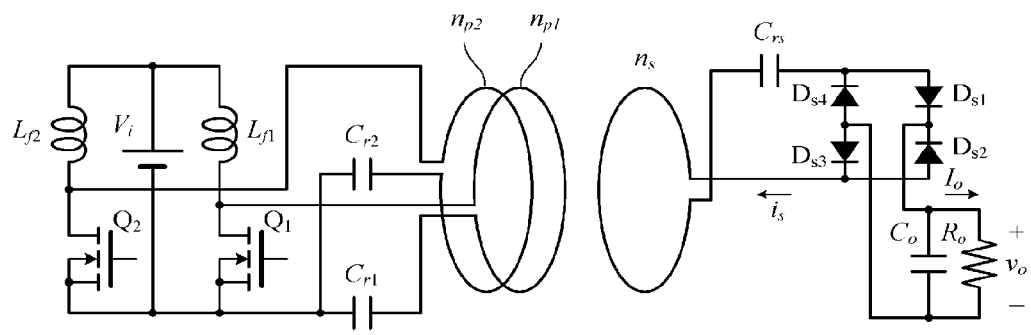
FIG. 15 is a circuit diagram of still another wireless power transfer apparatus according to the seventh embodiment.

In an example of FIG. 15, the circuit of the power sending device, illustrated in FIG. 13, is disposed in two sets on the power sending side to constitute a push-pull circuit. A diode bridge rectification circuit is constituted on the power receiving side. Respective planes in which power sending loop coils np1 and np2 define openings are positioned parallel and coupled to each other in the same phase. The power sending loop coils np1 and np2 are both coupled to the power receiving loop coil ns through the electromagnetic field resonant coupling. As a result, a larger amount of electric power can be transferred in comparison with the case of forming a push-pull arrangement with one switching element. Furthermore, an electromagnetic field resonant coupling circuit operating equivalently at a doubled frequency can be formed by controlling two switching elements Q1 and Q2 to alternately perform the switching operation.

The power sending loop coils np1 and np2 are not always required to be coupled to each other. Thus, the power sending loop coils np1 and np2 may be set orthogonal to each other. Such an arrangement widens a range of azimuth angle (directivity) where the power sending loop coils np1 and np2 can be coupled to the power receiving loop coil ns.

According to the seventh embodiment described above, the power receiving-side rectification circuit is connected in series to the resonant capacitor in order to rectify the current flowing through the resonant capacitor and to supply the rectified current to the load. Therefore, a large current can be supplied to the load with the rectification of the current flowing through the resonant capacitor. In addition, the withstand voltage of a rectification element can be reduced, and a rectification loss can be reduced. As a result, the efficiency of the wireless power transfer apparatus can be increased, and the size and the weight thereof can be reduced.

Eighth Embodiment

In an eighth embodiment, a wireless power transfer apparatus in which a power receiving-side rectification circuit is connected in parallel to the resonant capacitor Crs constituting the power receiving-side resonant circuit to take out a current from a voltage, which is applied to the resonant capacitor Crs, and to rectify the current to be output for supply of electric power to the load will be described with reference to FIGS. 16 to 21.

FIGS. 16 to 21 are each a circuit diagram of the wireless power transfer apparatus according to the eighth embodiment. An antiparallel diode and a parasitic capacitor of each switching element are not illustrated.

Figure 16:
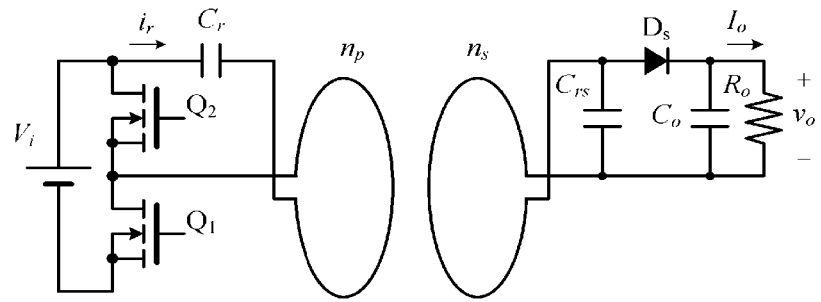
FIG. 16 is a circuit diagram of a wireless power transfer apparatus according to an eighth embodiment.

In FIG. 16, the power receiving-side rectification circuit is a half-wave rectification circuit. A diode Ds rectifies the current flowing through the resonant capacitor Crs and supplies the rectified current to the load.

Figure 17:
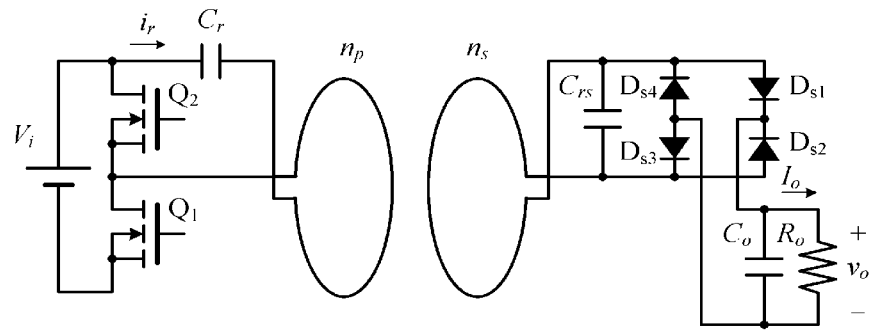
FIG. 17 is a circuit diagram of another wireless power transfer apparatus according to the eighth embodiment.

In FIG. 17, the power receiving-side rectification circuit is a diode bridge circuit constituted by diodes Ds1, Ds2, Ds3, and Ds4.

Figure 18:
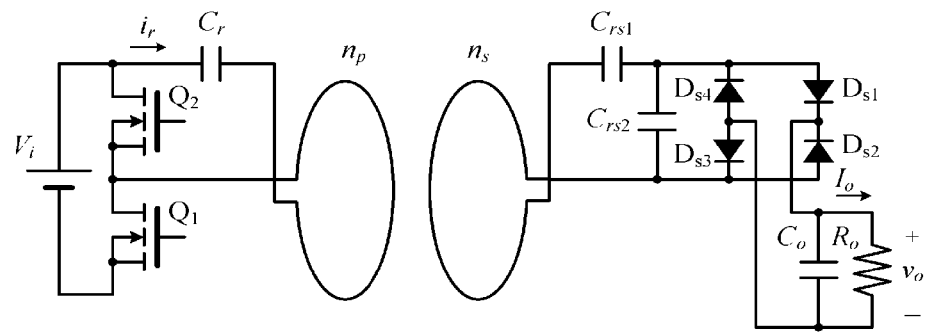
FIG. 18 is a circuit diagram of still another wireless power transfer apparatus according to the eighth embodiment.

In FIG. 18, the power receiving-side rectification circuit is a diode bridge circuit constituted by diodes Ds1, Ds2, Ds3, and Ds4. Unlike the example of FIG. 17, two resonant capacitors Crs1 and Crs2 are disposed on the power receiving side, and a voltage divided by those two resonant capacitors Crs1 and Crs2 is rectified in FIG. 18.

Figure 19:
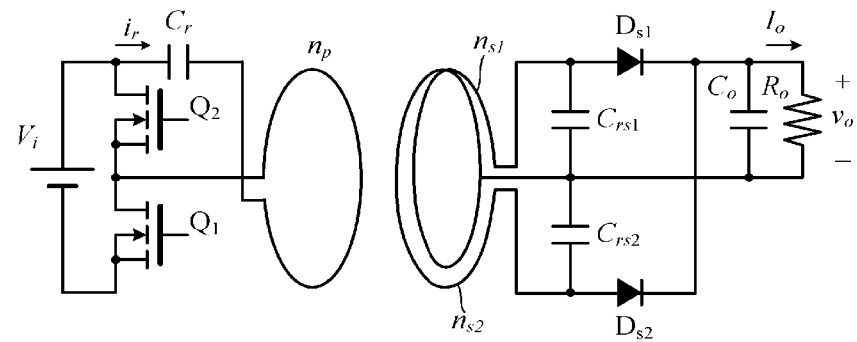
FIG. 19 is a circuit diagram of still another wireless power transfer apparatus according to the eighth embodiment.

In FIG. 19, the power receiving device includes power receiving loop coils ns1 and ns2 having a center tap. Rectification circuits are connected respectively to the power receiving loop coils ns1 and ns2. Thus, a rectification circuit having a center tap is constituted. The power receiving loop coils ns1 and ns2 are not always required to have the center tap withdrawn from a midpoint, and those two loop coils may be connected in series. In addition, those two loop coils are not always required to be coupled to each other. Thus, the power receiving loop coils ns1 and ns2 may be set orthogonal to each other. Such an arrangement widens a range of azimuth angle (directivity) where the power sending loop coil np can be coupled to the power receiving loop coils ns1 and ns2.

Figure 20:
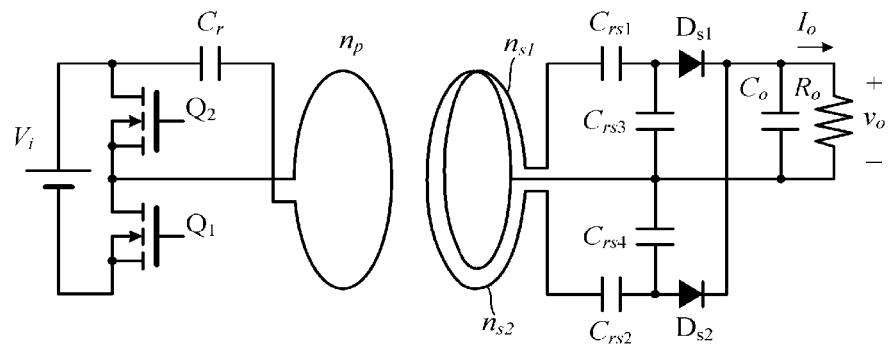
FIG. 20 is a circuit diagram of still another wireless power transfer apparatus according to the eighth embodiment.

In FIG. 20, the power receiving device includes power receiving loop coils ns1 and ns2 having a center tap. Unlike the example of FIG. 19, two resonant capacitors Crs1 and Crs3 are connected to the power receiving loop coil ns1 to rectify a voltage divided by those two resonant capacitors Crs1 and Crs3. Similarly, two resonant capacitors Crs2 and Crs4 are connected to the power receiving loop coil ns2 to rectify a voltage divided by those two resonant capacitors Crs2 and Crs4.

Figure 21:
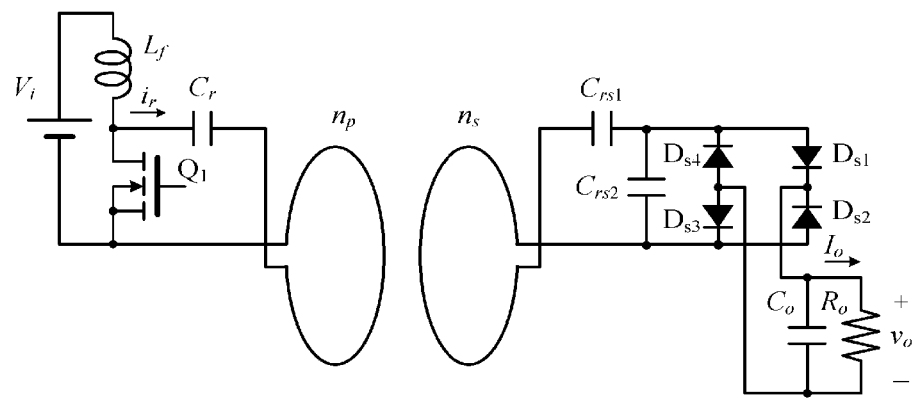
FIG. 21 is a circuit diagram of still another wireless power transfer apparatus according to the eighth embodiment.

In FIG. 21, the power receiving-side rectification circuit is a diode bridge circuit constituted by diodes Ds1, Ds2, Ds3, and Ds4. Unlike the example of FIG. 18, the power sending device includes an inductor Lf, and only one switching element Q1 is disposed on the power sending side. An inductance value of the inductor Lf is sufficiently larger than that of the power sending loop coil np, and it exhibits a high impedance at the switching frequency. Thus, variation of a current flowing through the inductor Lf is sufficiently small.

Ninth Embodiment

In a ninth embodiment, a wireless power transfer apparatus utilizing a junction capacitance of a rectification element as the resonant capacitor or a part of the resonant capacitor will be described below with reference to FIGS. 22 and 23.

Figure 22:
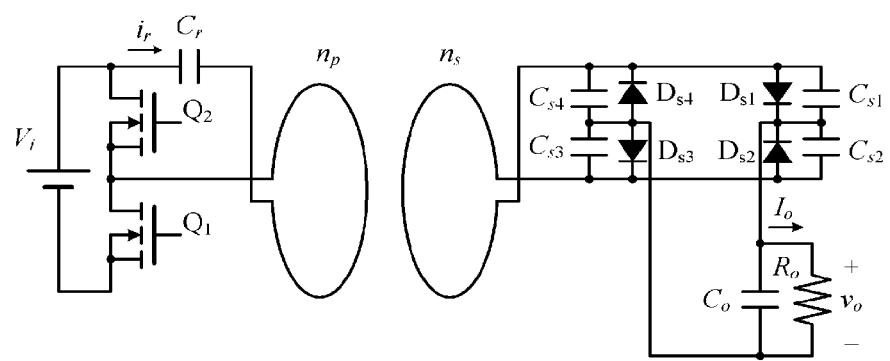
FIG. 22 is a circuit diagram of a wireless power transfer apparatus according to a ninth embodiment.

In FIG. 22, the power receiving device includes a diode bridge circuit constituted by diodes Ds1, Ds2, Ds3, and Ds4. The diodes Ds1, Ds2, Ds3, and Ds4 have junction capacitances Cs1, Cs2, Cs3, and Cs4, respectively. Those junction capacitances are utilized as a resonant capacitor. Though the junction capacitances Cs1, Cs2, Cs3, and Cs4 are explicitly illustrated as circuit elements in FIG. 22, they are actually respective parasitic capacitances of the diodes Ds1, Ds2, Ds3, and Ds4. In this embodiment, the specific resonant capacitor (Crs) is not disposed.

Figure 23:
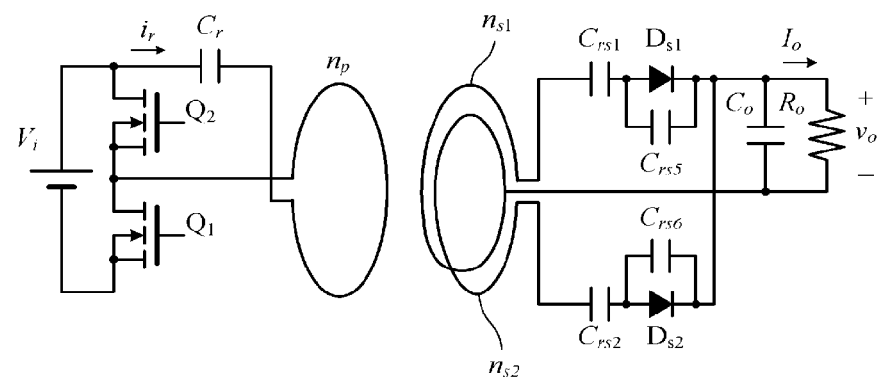
FIG. 23 is a circuit diagram of another wireless power transfer apparatus according to the ninth embodiment.

In FIG. 23, the power receiving device includes power receiving loop coils ns1 and ns2 having a center tap. Rectification circuits are connected to those two power receiving loop coils ns1 and ns2, respectively.

Capacitors Crs5 and Crs6 connected in parallel to the diodes Ds1 and Ds2 are respective junction capacitances of the diodes Ds1 and Ds2. A serial circuit of a capacitor Crs1 connected in series to the power receiving loop coil ns1 and the junction capacitance Crs5 acts as a resonant capacitor. Similarly, a serial circuit of a capacitor Crs2 connected in series to the power receiving loop coil ns2 and a junction capacitance Crs6 acts as the resonant capacitor.

Tenth Embodiment

Figure 24:
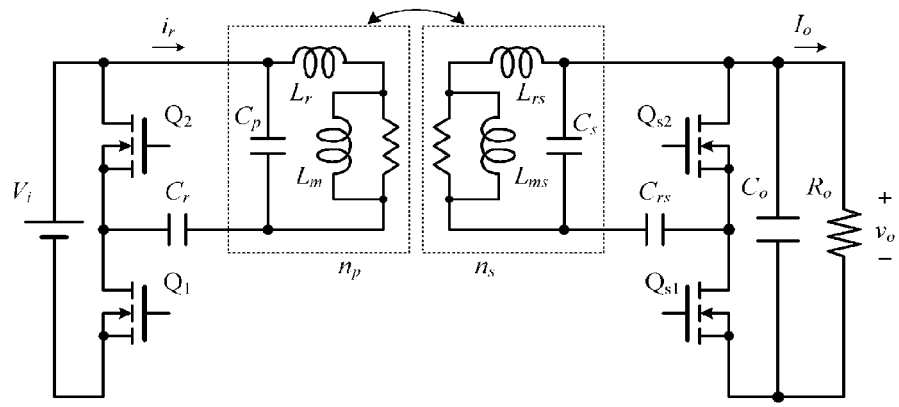
FIG. 24 is a circuit diagram of a wireless power transfer apparatus according to a tenth embodiment.

FIG. 24 is a circuit diagram of a wireless power transfer apparatus according to a tenth embodiment. In FIG. 24, a power sending loop coil np and a power receiving loop coil ns are represented by an equivalent circuit including an ideal transformer, mutual inductances Lm and Lms, leakage inductances Lr and Lrs, and stray capacitances Cp and Cs.

In this embodiment, the stray capacitance Cp of the power sending loop coil np or the stray capacitance Cs of the power receiving loop coil ns is utilized as a resonant capacitor or a part of the resonant capacitor.

By utilizing the stray capacitance of the loop coil as the resonant capacitor or a part of the resonant capacitor as described above, electromagnetic field resonance energy can be increased. Moreover, since the number of components is reduced, the size and the weight of the wireless power transfer apparatus can be reduced.

Eleventh Embodiment

Figure 25:
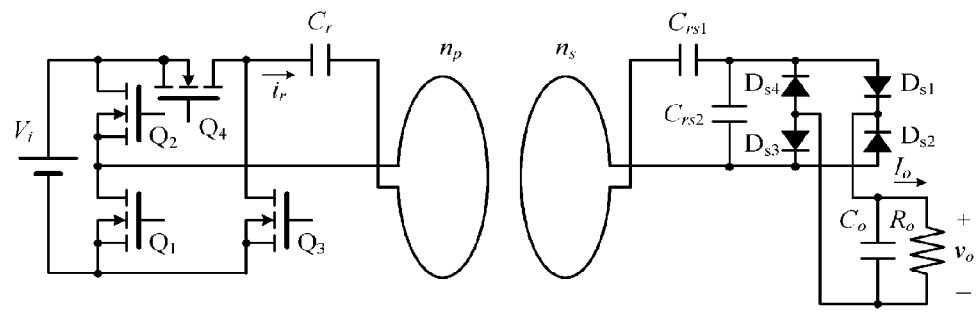
FIG. 25 is a circuit diagram of a wireless power transfer apparatus according to an eleventh embodiment.

FIG. 25 is a circuit diagram of a wireless power transfer apparatus according to an eleventh embodiment. In FIG. 25, the power receiving-side rectification circuit is a diode bridge circuit constituted by diodes Ds1, Ds2, Ds3, and Ds4. Unlike the example illustrated in FIG. 18, the power sending device includes a bridge circuit constituted by four switching elements Q1 to Q4. The switching elements Q1 and Q4 are turned on and off together, and the switching elements Q2 and Q3 are turned on and off together. The switching elements Q1 and Q2 are alternately turned on and off. Thus, the resonant current may be generated by forming the power sending-side switching circuit in a full-bridge arrangement, and by alternately turning on and off two sets of the four bridge-connected switching elements.

Thus, by connecting the switching elements in the bridge arrangement on the power sending device side, a voltage applied to each switching element is reduced. As a result, the efficiency of the wireless power transfer apparatus can be increased, and the size and the weight thereof can be reduced.

Twelfth Embodiment

Figure 26:
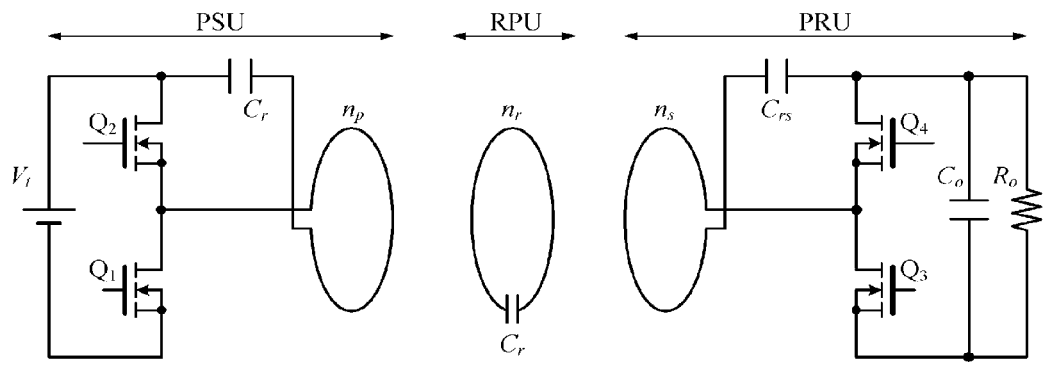
FIG. 26 is a circuit diagram of a wireless power transfer apparatus according to a twelfth embodiment.

FIG. 26 is a circuit diagram of a wireless power transfer apparatus according to a twelfth embodiment. The wireless power transfer apparatus according to this embodiment includes a power sending device PSU, a power receiving device PRU, and a repeater device RPU.

The repeater device RPU is constituted by a loop coil nr and a resonant capacitor Cr. A power sending loop coil np of the power sending device PSU and the loop coil nr of the repeater device RPU are coupled to each other through electromagnetic field resonant coupling, and the loop coil nr of the repeater device RPU and a power receiving loop coil ns of the power receiving device PRU are coupled to each other through electromagnetic field resonant coupling. By arranging the loop coil nr of the repeater device RPU between the power sending loop coil np and the power receiving loop coil ns as mentioned above, a power transmittable maximum distance between the power sending device PSU and the power receiving device PRU can be increased. The power transmittable maximum distance can be further increased by arranging the repeater device RPU in multiple stages.

While the foregoing embodiments have been described in connection with the example in which the power sending coil and the power receiving coil are both loop coils, only one of the power sending coil and the power receiving coil may be a loop coil. For example, the other coil may be a coil in the form of a normal-mode helical antenna having a large opening diameter, or a coil with a core.

While the foregoing embodiments have been described in connection with the example in which one set of wireless power transfer apparatus is constituted by one power sending device and one power receiving device, the wireless power transfer apparatus may include a plurality of power receiving devices that receive electric power from a common power sending device. As an alternative, electric power may be transferred from a plurality of power sending devices to a common power receiving device.

The invention claimed is:

1. A wireless power transfer apparatus constituted by a power sending device including a power sending coil, and a power receiving device including a power receiving coil, the wireless power transfer apparatus comprising:
   at least one resonant capacitor that is connected equivalently in series to the power sending coil to constitute a power sending-side resonant circuit;
   a power sending-side switching circuit including a switching element that is connected to the power sending-side resonant circuit, and that is turned on and off to intermittently apply DC power to the power sending-side resonant circuit and to generate a resonant current in the power sending-side resonant circuit, and a switching control circuit that controls the switching element;
   at least one resonant capacitor that is connected equivalently in series to the power receiving coil to constitute a power receiving-side resonant circuit; and
   a power receiving-side rectification circuit connected to the power receiving-side resonant circuit and including a rectification element that rectifies a resonant current and supplies the current to a load,
   wherein at least one of the power sending coil and the power receiving coil is a loop coil having a ten times or more larger diameter than a conductor line and being equivalent to a single turn,
   the loop coil is electrically directly connected to the switching element or the rectification circuit,
   the power sending coil takes out electric energy from the DC power and generates periodically-varying electromagnetic field resonance energy in a space,
   the power receiving coil takes out, as electric energy, the periodically-varying electromagnetic field resonance energy from the space and supplies electric power to the load,
   at least one of the power sending-side resonant circuit and the power receiving-side resonant circuit is constituted by leakage inductance of the loop coil,
   electromagnetic field resonant coupling is formed by synchronizing a switching frequency with a resonance frequency of a multi-resonant circuit,
   electric power is transmitted from the power sending device to the power receiving device through the electromagnetic field resonant coupling that is formed through a process of equivalently forming a mutual inductance between the power sending coil and the power receiving coil with mutual induction, causing the power sending-side resonant circuit and the power receiving-side resonant circuit to resonate with each other, and generating the resonant current flowing through the mutual inductance,
   the current flowing through the loop coil flows only as a resonant current containing mainly a switching frequency component due to resonant operation while currents of higher-order frequency components exhibiting large impedances are cut by an electromagnetic resonant coupling circuit, and
   energy is preserved as resonance energy in the power sending-side resonant circuit or the power receiving-side resonant circuit,
   wherein fr denotes a resonant frequency at which an input impedance is minimized when looking at an entirety of a load side from an input of the power sending-side resonant circuit, which is connected to the power sending-side switching circuit, and fs denotes a switching frequency, and a load is connected to an output of the power receiving device to set fr such that fr and fs have substantially same frequency.

2. The wireless power transfer apparatus according to claim 1, wherein the loop coil is formed in a two-dimensional plane.

3. The wireless power transfer apparatus according to claim 1, wherein the loop coil is formed in two two-dimensional planes, which are orthogonal to each other, to constitute the loop coil in a three-dimensional space.

4. The wireless power transfer apparatus according to claim 1, wherein the loop coil is formed in three two-dimensional planes, which are orthogonal to one another, to constitute the loop coil in a three-dimensional space.

5. The wireless power transfer apparatus according to claim 1, wherein the loop coil is formed in a pattern of multiple turns in one two-dimensional plane.

6. The wireless power transfer apparatus according to claim 1, wherein the switching control circuit performs a zero voltage switching operation by controlling the switching element to be turned on when a voltage across the switching element is reduced to a vicinity of zero voltage.

7. The wireless power transfer apparatus according to claim 1, wherein the power receiving-side rectification circuit is connected in series to the resonant capacitor constituting the power receiving-side resonant circuit to rectify the current flowing through the resonant capacitor to be output for supply of electric power to the load.

8. The wireless power transfer apparatus according to claim 1, wherein the power receiving-side rectification circuit is connected in parallel to the resonant capacitor constituting the power receiving-side resonant circuit to take out a current from a voltage, which is applied to the resonant capacitor, and to rectify the current to be output for supply of electric power to the load.

9. The wireless power transfer apparatus according to claim 1, wherein the power receiving-side rectification circuit is a bridge rectification circuit.

10. The wireless power transfer apparatus according to claim 1, wherein the power receiving-side rectification circuit is a half-wave rectification circuit.

11. The wireless power transfer apparatus according to claim 1, wherein the power receiving-side rectification circuit is a voltage doubler rectification circuit.

12. The wireless power transfer apparatus according to claim 1, wherein a resonant frequency of the power sending-side resonant circuit and a resonant frequency of the power receiving-side resonant circuit are matched with each other within a range of ±20%.

13. The wireless power transfer apparatus according to claim 1, wherein a junction capacitance of the rectification element is utilized as the resonant capacitor or a part of the resonant capacitor.

14. The wireless power transfer apparatus according to claim 1, wherein a stray capacitance of the loop coil is utilized as a whole or a part of the resonant capacitor.

15. The wireless power transfer apparatus according to claim 1, wherein the switching element is an FET, and the power sending-side switching circuit includes a parasitic capacitance of the FET and an antiparallel diode.

16. The wireless power transfer apparatus according to claim 1, wherein the power sending-side switching circuit is constituted in a half-bridge arrangement.

17. The wireless power transfer apparatus according to claim 1, wherein the power sending-side switching circuit is constituted in a full-bridge arrangement.

18. The wireless power transfer apparatus according to claim 1, wherein the power receiving-side rectification circuit is a synchronous rectification circuit including a switching element.

* * * * *